(12) United States Patent
King (10) Patent No.: US 7,005,210 B2
(45) Date of Patent: Feb. 28, 2006

(54) FLOW FIELDS FOR FUEL CELLS

(75) Inventor: George R. King, The Woodlands, TX (US)

(73) Assignee: The Texas A&M University System, College Station, TX (US)

( * ) Notice: Subject to any disclaimer, the term of this patent is extended or adjusted under 35 U.S.C. 154(b) by 152 days.

(21) Appl. No.: 10/267,559

(22) Filed: Oct. 9, 2002

(65) Prior Publication Data

US 2004/0048140 A1 Mar. 11, 2004

Related U.S. Application Data

(63) Continuation of application No. 09/669,344, filed on Sep. 26, 2000, now Pat. No. 6,531,238.

(51) Int. Cl.
*H01M 8/02* (2006.01)
*B32B 15/02* (2006.01)

(52) U.S. Cl. .................. 429/38; 429/39; 264/44; 264/49; 428/182; 428/613

(58) Field of Classification Search ................ 429/34, 429/35, 36, 37, 38, 39, 235; 264/42, 44, 264/49; 428/182, 613, 40, 44
See application file for complete search history.

(56) References Cited

U.S. PATENT DOCUMENTS

| | | | | |
|---|---|---|---|---|
| 3,616,841 A | 11/1971 | Walz | ............................ | 164/34 |
| 3,617,385 A * | 11/1971 | Gray | ............................ | 429/39 |
| 3,814,631 A | 6/1974 | Warszawski et al. | .......... | 429/39 |
| 4,058,482 A | 11/1977 | Baris et al. | ............... | 252/425.3 |
| 4,124,478 A | 11/1978 | Tsien et al. | | |
| 4,125,676 A | 11/1978 | Maricle et al. | ................ | 429/38 |
| 4,175,165 A | 11/1979 | Adlhart | ........................ | 429/30 |
| 4,214,969 A | 7/1980 | Lawrance | | |
| 4,274,939 A | 6/1981 | Bjäreklint | | |
| 4,496,437 A | 1/1985 | McIntyre et al. | .............. | 204/24 |
| H16 H | 1/1986 | Kaun | ........................... | 429/29 |
| 4,758,481 A * | 7/1988 | Fauvel | ........................ | 429/39 |
| 4,818,741 A | 4/1989 | Herscovici | ................... | 502/101 |
| 4,876,115 A | 10/1989 | Raistrick | ..................... | 427/115 |
| 4,910,099 A | 3/1990 | Gottesfeld | .................... | 429/13 |
| 5,079,105 A | 1/1992 | Bossel | ........................... | 429/19 |
| 5,364,712 A | 11/1994 | Townsend | .................... | 429/42 |
| 5,366,819 A | 11/1994 | Hartvigsen et al. | ........... | 429/17 |
| 5,418,079 A | 5/1995 | Diethelm | ...................... | 429/26 |
| 5,482,792 A | 1/1996 | Faita et al. | .................... | 429/30 |
| 5,565,072 A | 10/1996 | Faita et al. | .................. | 204/256 |
| 5,578,388 A | 11/1996 | Faita et al. | .................... | 429/30 |
| 5,589,285 A | 12/1996 | Cable et al. | ................... | 429/13 |
| 5,763,114 A | 6/1998 | Khandkar et al. | ............. | 429/20 |

(Continued)

FOREIGN PATENT DOCUMENTS

DE 19812155 A 9/1999

(Continued)

*Primary Examiner*—Stephen J. Kalafut
(74) *Attorney, Agent, or Firm*—Baker Botts L.L.P.

(57) ABSTRACT

An improved proton exchange membrane fuel cell assembly and fuel cell stack assembly are provided for the economical and efficient production of electricity. The present invention comprises improved flow fields, which provide improved and more efficient mass transport of the reactants in the fuel cell and the fuel cell stack assembly. The improved flow fields comprise three-dimensional open-cell foamed metals that are preferably plated with gold. The improved reactant supply system comprises an improved distribution frame to house fuel cells wherein the reactants are directly connected to the improved flow fields.

9 Claims, 8 Drawing Sheets

U.S. PATENT DOCUMENTS

| | | | |
|---|---|---|---|
| 5,853,910 A | 12/1998 | Tomioka et al. | 429/17 |
| 5,879,826 A | 3/1999 | Lehman et al. | 429/13 |
| 5,942,350 A | 8/1999 | Roy et al. | |
| 6,007,932 A | 12/1999 | Steyn | 429/31 |
| 6,022,634 A | 2/2000 | Ramunni et al. | 429/34 |
| 6,051,117 A | 4/2000 | Novak et al. | 204/252 |
| 6,140,266 A | 10/2000 | Corrigan et al. | 502/439 |
| 6,146,780 A | 11/2000 | Cisar et al. | 429/34 |
| 6,232,010 B1 | 5/2001 | Cisar et al. | 429/40 |
| 6,238,819 B1 * | 5/2001 | Cahill et al. | 429/235 X |
| 6,280,870 B1 | 8/2001 | Eisman et al. | 429/34 |
| 6,284,399 B1 | 9/2001 | Oko et al. | 429/19 |
| 6,344,290 B1 | 2/2002 | Bossel | |
| 6,372,376 B1 | 4/2002 | Fronk et al. | 429/41 |
| 6,387,556 B1 | 5/2002 | Fuglevand et al. | 429/22 |
| 6,387,557 B1 | 5/2002 | Krasij et al. | 429/32 |
| 6,399,234 B1 | 6/2002 | Bonk et al. | 429/32 |
| 6,403,249 B1 | 6/2002 | Reid | 429/39 |
| 6,410,180 B1 | 6/2002 | Cisar et al. | 429/41 |
| 6,413,664 B1 | 7/2002 | Wilkinson et al. | 429/34 |
| 6,531,238 B1 * | 3/2003 | King | 429/38 |
| 6,656,624 B1 * | 12/2003 | King | 429/34 |
| 2002/0068208 A1 | 6/2002 | Dristy et al. | 429/34 |
| 2004/0048138 A1 | 3/2004 | King | |
| 2004/0048139 A1 | 3/2004 | King | |

FOREIGN PATENT DOCUMENTS

| | | |
|---|---|---|
| EP | 0 709 907 A1 | 5/1996 |
| JP | 05041239 | 6/1993 |
| JP | 63232275 | 9/1998 |
| WO | WO 96/20509 A1 | 7/1996 |
| WO | WO 97/24474 A1 | 7/1997 |
| WO | WO 00/72373 A1 | 11/2000 |

* cited by examiner

FLOW FIELDS FOR FUEL CELLS

RELATED REFERENCES

This application is a continuation of application Ser. No. 09/669,344, filed Sep. 26, 2000 now U.S. Pat. No. 6,531,238.

BACKGROUND OF THE INVENTION

The present invention relates in general to the field of proton exchange membrane ("PEM") fuel cell systems, and more particularly, to an improved PEM fuel cell system having improved discrete fuel cell modules with improved mass transport for ternary reaction optimization and a method for manufacturing same.

A fuel cell is an electrochemical device that converts fuel and oxidant into electricity and a reaction by-product through an electrolytic reaction that strips hydrogen molecules of their electrons and protons. Ultimately, the stripped electrons are collected into some form of usable electric current, by resistance or by some other suitable means. The protons react with oxygen to form water as a reaction by-product.

Natural gas is the primary fuel used as the source of hydrogen for a fuel cell. If natural gas is used, however, it must be reformed prior to entering the fuel cell. Pure hydrogen may also be used if stored correctly. The products of the electrochemical exchange in the fuel cell are DC electricity, liquid water, and heat. The overall PEM fuel cell reaction produces electrical energy equal to the sum of the separate half-cell reactions occurring in the fuel cell, less its internal and parasitic losses. Parasitic losses are those losses of energy that are attributable to any energy required to facilitate the ternary reactions in the fuel cell.

Although fuel cells have been used in a few applications, engineering solutions to successfully adapt fuel cell technology for use in electric utility systems have been elusive. The challenge is for the generation of power in the range of 1 to 100 kW that is affordable, reliable, and requires little maintenance. Fuel cells would be desirable in this application because they convert fuel directly to electricity at much higher efficiencies than internal combustion engines, thereby extracting more power from the same amount of fuel. This need has not been satisfied, however, because of the prohibitive expense associated with such fuel cell systems. For example, the initial selling price of the 200 kW PEM fuel cell was about $3500/kW to about $4500/kW. For a fuel cell to be useful in utility applications, the life of the fuel cell stack must be a minimum of five years and operations must be reliable and maintenance-free. Heretofore known fuel cell assemblies have not shown sufficient reliability and have disadvantageous maintenance issues. Despite the expense, reliability, and maintenance problems associated with heretofore known fuel cell systems, because of their environmental friendliness and operating efficiency, there remains a clear and present need for economical and efficient fuel cell technology for use in residential and light-commercial applications.

Fuel cells are usually classified according to the type of electrolyte used in the cell. There are four primary classes of fuel cells: (1) proton exchange membrane ("PEM") fuel cells, (2) phosphoric acid fuel cells, and (3) molten carbonate fuel cells. Another more recently developed type of fuel cell is a solid oxide fuel cell. PEM fuel cells, such as those in the present invention, are low temperature low pressure systems, and are, therefore, well-suited for residential and light-commercial applications. PEM fuel cells are also advantageous in these applications because there is no corrosive liquid in the fuel cell and, consequently, there are minimal corrosion problems.

Figure 1:
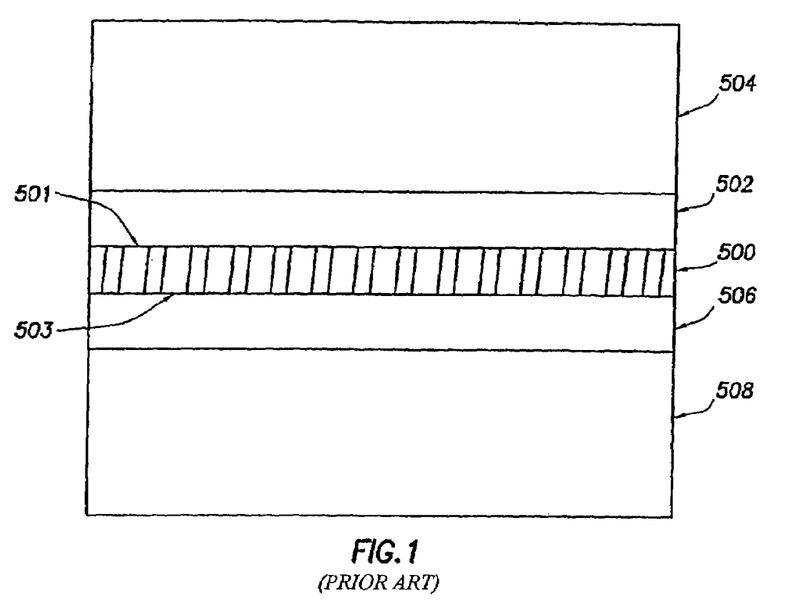
FIG. 1 is a schematic of a typical PEM fuel cell assembly.

Characteristically, a single PEM fuel cell consists of three major components—an anode gas dispersion field ("anode"); a membrane electrode assembly ("MEA"); and a cathode gas and liquid dispersion field ("cathode"). As shown in FIG. 1, the anode typically comprises an anode gas dispersion layer 502 and an anode gas flow field 504; the cathode typically comprises a cathode gas and liquid dispersion layer 506 and a cathode gas and liquid flow field 508. In a single cell, the anode and the cathode are electrically coupled to provide a path for conducting electrons between the electrodes through an external load. MEA 500 facilitates the flow of electrons and protons produced in the anode, and substantially isolates the fuel stream on the anode side of the membrane from the oxidant stream on the cathode side of the membrane. The ultimate purpose of these base components, namely the anode, the cathode, and MEA 500, is to maintain proper ternary phase distribution in the fuel cell. Ternary phase distribution as used herein refers to the three simultaneous reactants in the fuel cell, namely hydrogen gas, water vapor and air. Heretofore known PEM fuel cells, however, have not been able to efficiently maintain proper ternary phase distribution. Catalytic active layers 501 and 503 are located between the anode, the cathode and the electrolyte. The catalytic active layers 501 and 503 induce the desired electrochemical reactions in the fuel cell. Specifically, the catalytic active layer 501, the anode catalytic active layer, rejects the electrons produced in the anode in the form of electric current. The oxidant from the air that moves through the cathode is reduced at the catalytic active layer 503, referred to as the cathode catalytic active layer, so that it can oxidate the protons flowing from anode catalytic active layer 501 to form water as the reaction by-product. The protons produced by the anode are transported by the anode catalytic active layer 501 to the cathode through the electrolyte polymeric membrane.

The anode gas flow field and cathode gas and liquid flow field are typically comprised of pressed, polished carbon sheets machined with serpentine grooves or channels to provide a means of access for the fuel and oxidant streams to the anode and cathode catalytic active layers. The costs of manufacturing these plates and the associated materials costs are very expensive and have placed constraints on the use of fuel cells in residential and light-commercial applications. Further, the use of these planar serpentine arrangements to facilitate the flow of the fuel and oxidant through the anode and cathode has presented additional operational drawbacks in that they unduly limit mass transport through the electrodes, and therefore, limit the maximum power achievable by the fuel cell.

One of the most problematic drawbacks of the planar serpentine arrangement in the anode and cathode relates to efficiency. In conventional electrodes, the reactants move through the serpentine pattern of the electrodes and are activated at the respective catalytic layers located at the interface of the electrode and the electrolyte. The actual chemical reaction that occurs at the anode catalyst layer is: $H_2 \rightarrow 2H^+ + 2e^-$. The chemical reaction at the cathode catalyst layer is: $2H^+ + 2e^- + \frac{1}{2}O_2 \rightarrow H_2O$. The overall reaction is: $H_2 + \frac{1}{2}O_2 \rightarrow H_2O$. The anode disburses the anode gas onto the surface of the active catalyst layer comprised of a platinum catalyst electrolyte, and the cathode disburses the cathode gas onto the surface of the catalytic active layer of the electrolyte. However, when utilizing a conventional serpentine construction, the anode gas and the cathode gas are not uniformly disbursed onto the electrolyte. Nonuniform distribution of the anode and cathode gas at the membrane surface results in an imbalance in the water content of the electrolyte. This results in a significant decrease in efficiency in the fuel cell.

The second most problematic drawback associated with serpentine arrangements in the electrodes relates to the ternary reactions that take place in the fuel cell itself. Serpentine arrangements provide no pressure differential within the electrodes. This prohibits the necessary ternary reactions from taking place simultaneously. This is particularly problematic in the cathode as both a liquid and a gas are transported simultaneously through the electrode's serpentine pattern.

Another shortcoming of the conventional serpentine arrangement in the anode in particular is that the hydrogen molecules resist the inevitable flow changes in the serpentine channels, causing a build-up of molecular density in the turns in the serpentine pattern, resulting in temperature increases at the reversal points. These hot spots in the serpentine arrangement unduly and prematurely degrade the catalytic active layer and supporting membrane.

Figure 2:
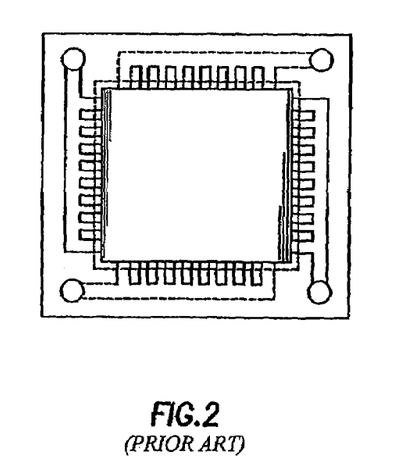
FIG. 2 is an illustration of a conventional frame for housing and supplying reactants to a fuel cell assembly.

In the typical PEM fuel cell assembly, a PEM fuel cell is housed within a frame that supplies the necessary fuel and oxidant to the flow fields of the fuel cell. These conventional frames typically comprise manifolds and channels that facilitate the flow of the reactants. However, usually the channels are not an integral part of the manifolds, which results in a pressure differential along the successive channels. FIG. 2 is an illustration of a conventional frame for the communication of the reactants to a fuel cell. This pressure differential causes the reactants, especially the fuel, to be fed into the flow fields unevenly, which results in distortions in the flow fields causing hot spots. This also results in non-uniform disbursement of the reactants onto the catalytic active layers. Ultimately, this conventional method of supplying the necessary fuel and oxidant to a fuel cell results in a very inefficient process.

As a single PEM fuel cell only produces about 0.30 to 0.90 volts D.C. under a load, the key to developing useful PEM fuel cell technology is being able to scale-up current density in individual PEM cell assemblies to produce sufficient current for larger applications without sacrificing fuel cell efficiency. Commonly, fuel cell assemblies are electrically connected in nodes that are then electrically connected in series to form "fuel cell stacks" by stacking individual fuel cell nodes. Two or more nodes can be connected together, generally in series, but sometimes in parallel, to efficiently increase the overall power output.

Conventional PEM fuel stacks often flood the cathode due to excess water in the cathode gas flow field. Flooding occurs when water is not removed efficiently from the system. Flooding is particularly problematic because it impairs the ability of the reactants to adequately diffuse to the catalytic active layers. This significantly increases the internal resistance of the cathode which ultimately limits the cell voltage potential. Another problem is dehydration of the polymeric membranes when the water supply is inadequate. Insufficient supply of water can dry out the anode side of the PEM-membrane electrolyte, causing a significant rise in stack resistance and reduced membrane durability.

Further, conventional PEM fuel cells and stacks of such fuel cell assemblies are compressed under a large load in order to ensure good electrical conductivity between cell components and to maintain the integrity of compression seals that keep various fluid streams separate. A fuel cell stack is usually held together with extreme compressive force, generally in excess of 40,000 psi, using compression assemblies, such as tie rods and end plates. If tie rods are used, the tie rods generally extend through holes formed in the peripheral edge portion of the stack end plates and have associated nuts or other fastening means assembling the tie rods to the stack assembly to urge the end plates of the fuel stack assembly toward each other. Typically, the tie rods are external, i.e., they do not extend through the fuel cell electrochemically active components. This amount of pressure that must be used to ensure good electrochemical interactions presents many operational difficulties. For example, if the voltage of a single fuel cell assembly in a stack declines significantly or fails, the entire stack must be taken out of service, disassembled, and repaired, resulting in significant repair costs and down-time. Second, inadequate compressive force can compromise the seals associated with the manifolds and flow fields in the central regions of the interior distribution plates, and also compromise the electrical contact required across the surfaces of the plates and MEAs to provide the serial electrical connection among the fuel cells that make up the stack. Third, the extreme compressive force used unduly abrades the surfaces of the fuel cell modules within the stack, resulting in wear of components in the fuel cell assemblies such as the catalyst layers of the electrolyte, thereby leading to increased losses in fuel cell stack and fuel cell assembly efficiency.

SUMMARY OF THE INVENTION

Accordingly, there is a need for an economical and efficient fuel cell assembly and fuel cell stack assembly with an optimized supply and mass transport system. Herein provided are improvements to the anode gas flow field and the cathode gas and liquid flow field. Further, maintenance and inspection of the fuel cell system of the present invention are less burdensome as very little compressive force is needed to ensure good electrochemical connection, enabling these fuel cell systems to be used effectively in residential and light-commercial applications. As a result, significant improvement in power density, efficiency, and life of the fuel cell are provided at the cell and stack level.

In one embodiment, the present invention comprises an improved gas flow field for a fuel cell assembly comprising a three-dimensional open cell foamed structure suitable for gas diffusion. In another embodiment, a method for making a three-dimensional open-cell foamed gas flow field is disclosed. Another embodiment of the present invention comprises a PEM fuel cell assembly having gas diffusion layer, gas and liquid diffusion layer, an anode gas flow field, and a cathode gas and liquid flow field. In still another embodiment, an improved fuel cell stack assembly is disclosed wherein the fuel cell assemblies of the stack comprise an open-cell foamed gas flow field and an open-cell foamed gas and liquid flow field. The present invention also provides for improved distribution for a fuel cell assembly providing for improved transport of the reactants to the fuel cell.

One advantage of the present invention is that these improvements increase the life and decrease the maintenance operations for a fuel cell. This enables the fuel cells to be used in residential and light-commercial applications effectively.

Another advantage is that the invention achieves optimal mass transport through the open cell foamed flow fields and the distribution frame of the present invention. This increases the overall efficiency and maximum power achievable by the fuel cell. Further, the anode gas and cathode gas are uniformly disbursed on the catalytic active layers of the electrolyte, resulting in optimal water balance in the fuel cell system. Flooding and drying out of the electrolyte are thereby avoided. In addition, hot spots that distort the fuel cell, resulting in maintenance to replace the damaged cell, are avoided. Maximum power is, thus, achievable.

Other advantages of the present invention will be apparent to those ordinarily skilled in the art in view of the following specification claims and drawings.

BRIEF DESCRIPTION OF THE DRAWINGS

A more complete understanding of the present embodiments and advantages thereof may be acquired by referring to the following description taken in conjunction with the accompanying drawings, in which like numbers indicate like features, and wherein.

DETAILED DESCRIPTION OF THE INVENTION

Figure 3:
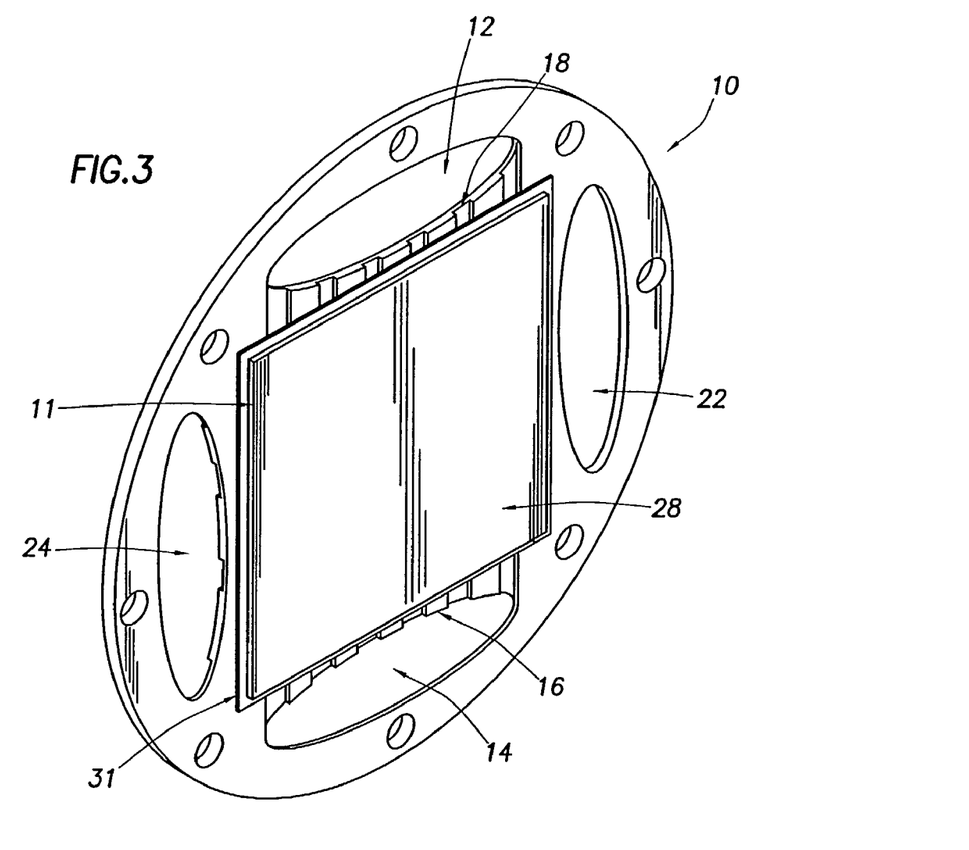
FIG. 3 is a depiction of a distribution frame of the present invention housing a fuel cell assembly.

FIG. 3 depicts one embodiment of an individual fuel cell assembly of the present invention. As shown in FIG. 3, fuel cell 11 is housed within distribution frame 10. Distribution frame 10 not only houses fuel cell 11, but also facilitates transportation of the fuel and the oxidant to the fuel cell necessary for the electrochemical exchange in the fuel cell. This individual fuel cell assembly can be combined with other fuel cell assemblies to form a fuel cell node, and ultimately a stack assembly, to provide higher voltages and current for power generation. Of note in FIG. 3 are fuel inlet 22, fuel inlet 24, air inlet 12 and air and water outlet 14. The fuel inlets 22 and 24, air inlet 12, and air and water outlet 14 are apertures in the distribution frame extending completely through the distribution frame, and run perpendicular, or at 90° angles, from one another in the distribution frame to facilitate the efficient flow of the fuel and oxidant to and through the anode gas and liquid flow field and cathode gas flow field, respectively.

Figure 4:
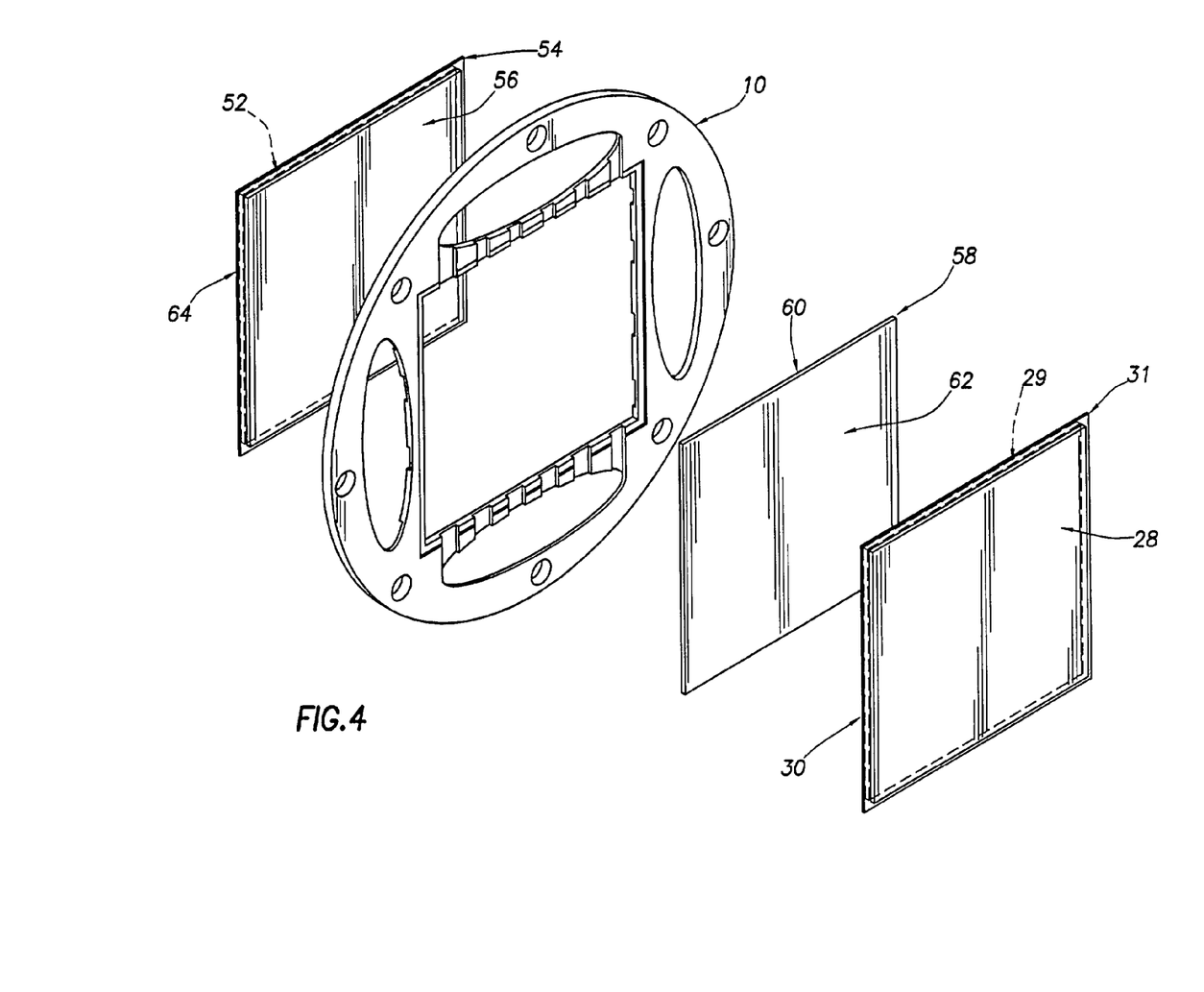
FIG. 4 is an exploded view of the distribution frame and a fuel cell assembly of the present invention.

FIG. 4 more particularly illustrates the component parts of the fuel cell assembly of one embodiment of the present invention depicted in FIG. 3, specifically distribution frame 10, primary internal foil assembly 64, fuel cell 11 and secondary internal foil assembly 30. Primary internal foil assembly 64 consists of primary anode gas flow field 52, primary internal foil 54 and primary cathode gas and liquid flow field 56. Primary internal foil 54 serves as a boundary layer between primary anode gas flow field 52 and primary cathode gas and liquid flow field 56 to keep air from flowing into the anode gas flow field from the cathode and water from flowing from the cathode gas and liquid flow field to the anode gas flow field. MEA 58 is composed of an electrolyte, primary cathode catalytic active layer 60, and secondary anode catalytic active layer 62. Any known MEAs may be used in the present invention. Conventional fluorocarbon based polymeric membranes are particularly suitable for the present invention-including Nafion membranes. Primary cathode catalytic active layer 60 is bonded to primary cathode gas and liquid flow field 56 when the fuel cell is assembled. Secondary internal foil 31 also serves as a boundary layer between the anode and cathode electrodes of the internal foil assembly as does primary internal foil 54. Secondary anode catalytic active layer 62 is bonded to secondary anode gas flow field 29 when the fuel cell assembly is assembled. FIG. 4 illustrates the assembled fuel cell placed in distribution frame 10 wherein secondary cathode gas flow field 28 is in view. Secondary internal foil 31 is also illustrated in FIG. 3.

When the fuel cell assembly of the present invention is assembled as in the embodiments depicted in FIGS. 3 and 4, the procession of layers is: primary anode gas flow field 52, primary internal foil 54, primary cathode gas flow field 56, MEA 58, secondary anode gas flow field 29, secondary internal foil 31, and secondary cathode gas flow field 28. This defines the elements of one fuel cell of the present invention terminated by internal foil assemblies. Primary cathode catalyst layer 60 and secondary anode catalyst layer 62 of the MEA shown in FIG. 4 may be comprised of platinum or a platinum/ruthenium catalyst. If platinum is used, it is typically combined with fibrous material, including suitable nonwovens, or suitable cotton muslin sheets or pieces of fabric. Primary cathode gas flow field 56 and secondary anode gas flow field 29 are bonded to primary cathode catalytic active layer 60 and secondary anode catalytic active layer 62, respectively, through mechanical bonding means such as compression or adhesion. However, there is no need for excessive compressive force in the present invention to create the electrochemical connections between the catalytic active layers and the gas flow fields. Compression may be provided by any known means, such as a tie-rod assembly. In general, the compressive force on a fuel cell stack should be less than 100 psi.

Figure 5:
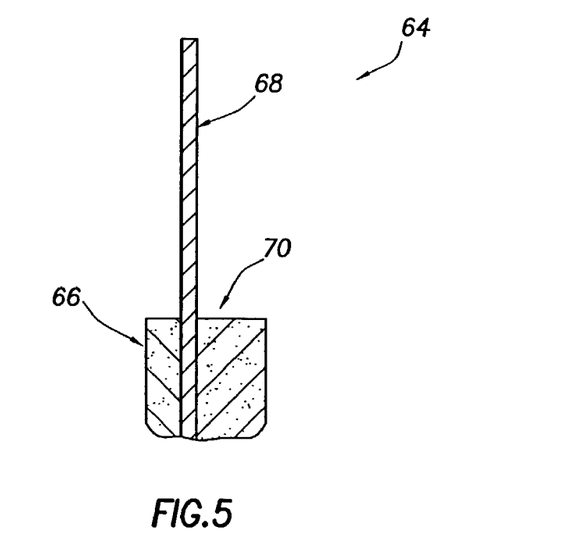
FIG. 5 is a cross-sectional view of an internal foil assembly of the present invention.
Figure 6:
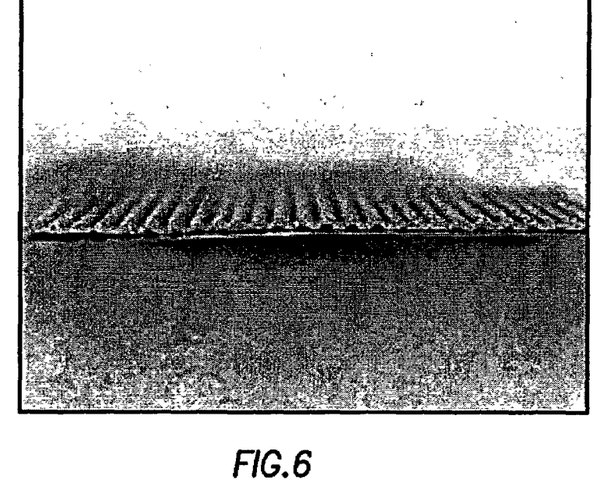
FIG. 6 is an electron micrograph of a three-dimensional open-cell foamed cathode gas and liquid flow field with microchannels.
Figure 6A:
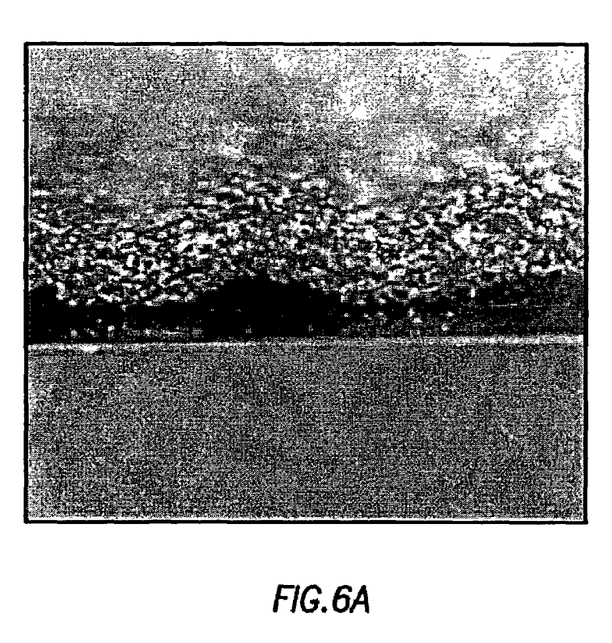
FIG. 6A is an electron micrograph of the three-dimensional open-cell foamed cathode gas and liquid flow field with microchannels of the present invention magnified 10 times.
Figure 6B:
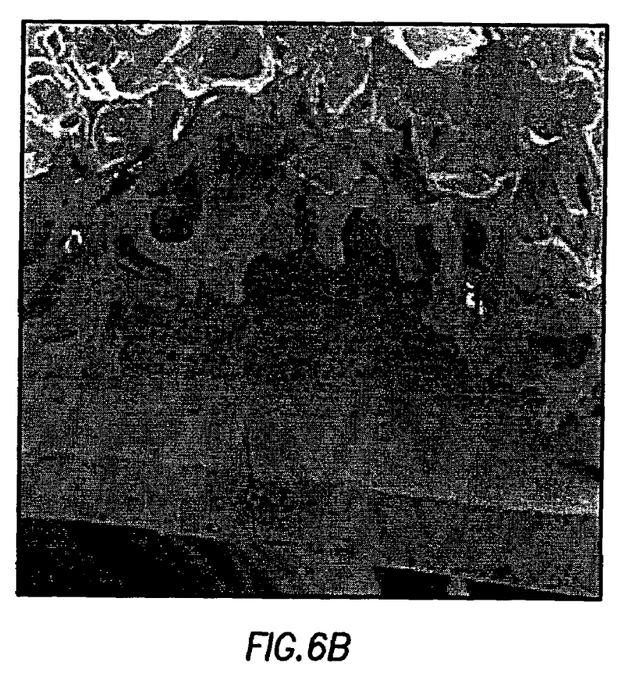
FIG. 6B is an electron micrograph of the three-dimensional open-cell foamed cathode gas and liquid flow field with microchannels of the present invention magnified 20 times.

FIG. 5 is a cross-section of an internal foil assembly of the present invention. Internal foil assembly 64 is comprised of three parts: anode gas flow field 66, internal foil 68, and cathode gas and liquid flow field 70. The cross section of the anode gas flow field 66 may be preferably approximately half the size of cathode gas and liquid flow field 70 to accommodate the ratios of reactants necessary for the electrochemical exchange in the fuel cell. Both anode gas flow field 66 and cathode gas and liquid flow field 70 may be composed of a three-dimensional open-cell foamed structure suitable for gas diffusion that, preferably, may be plated with gold. In another embodiment of the present invention, cathode gas flow field 70 may be corrugated to create microchannels. FIG. 6 illustrates a corrugated cathode gas and liquid flow field of the present invention. These microchannels facilitate the removal of free water and excessive heat from the fuel cell assembly. When the fuel cell is placed in the distribution frame, these microchannels in the cathode gas and liquid flow field 70 run parallel to the air inlet and air and water outlet, and perpendicular to the fuel inlets. The vertical distance between the peak of a corrugation and the trough next to it, herein referred to as the pitch, should be at least ⅔ of the horizontal distance between a peak of one corrugation to the peak of the next corrugation, herein referred to as the run. Whereas, as shown in FIG. 5, anode gas flow field 66 is directly bonded to internal foil 68; in an alternative embodiment cathode gas and liquid flow field 70 is only bonded to the internal foil at the peaks of the corrugations. As shown in FIG. 6, the cathode gas and liquid flow field is therefore intermittently bonded to the internal foil at the peaks of the microchannels. This structure effectively manages the ternary reactions necessary for fuel cell operability by adequately removing the water and facilitating the movement of hydrogen and air. FIGS. 6A and 6B depict magnified views of the microchannels shown in FIG. 6.

Suitable construction materials for the three-dimensional open-cell foamed gas flow fields and gas and liquid flow fields are conducive to flow distribution and possess good electrical conductivity properties. These may include: plastics, carbon filament, stainless steel and its derivatives, epitaxial substrates, nickel and its alloys, gold and its alloys, and copper and its alloys. Iridium may also be used if it has sufficient electrochemical properties. In one embodiment of the present invention, the anode gas flow field and the cathode gas and liquid flow fields are made from open-cell foamed nickel. The open-cell foamed nickel flow fields are produced by electroplating nickel over a particulate plastic so that the voids created by the tangential intersections in the particulate plastic structure are filled with nickel. Although polystyrene may be used in this method of producing the foamed flow field structure, other materials, such as other particulate thermoplastic resinous materials, would also be suitable in this process. Another suitable material, for example, would be Isinglass. If nickel is used, the nickel may be enhanced with 2.0% by weight of cobalt. The addition of cobalt enhances the mechanical strength of the nickel and reduces the drawing properties of the nickel. The addition of cobalt also strengthens the lattice structure of the finished open-cell foamed flow field. Once the nickel has cooled, the polystyrene plastic may be blown out of the foam with hot carbon dioxide gas or air leaving a three-dimensional nickel open-cell foamed flow field structure having substantially five-sided geometrically-shaped orifices. The nickel foamed flow field is autocatalytically microplated with up to 15 microns of gold, iridium, copper or silver. Preferably, the flow field is microplated, with between 0.5 to 2.0 microns of gold.

Figure 7:
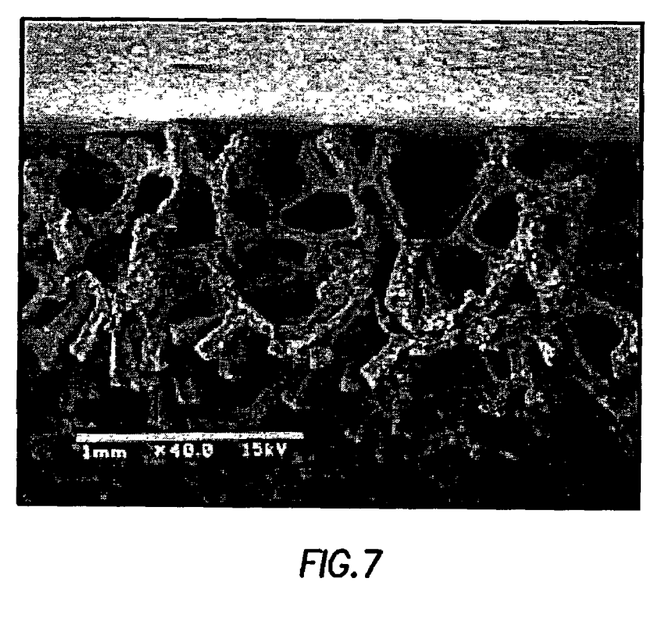
FIG. 7 is an electron micrograph of the connections between a three-dimensional open-cell foamed gas flow field and an internal foil in an internal foil assembly of the present invention.
Figure 8:
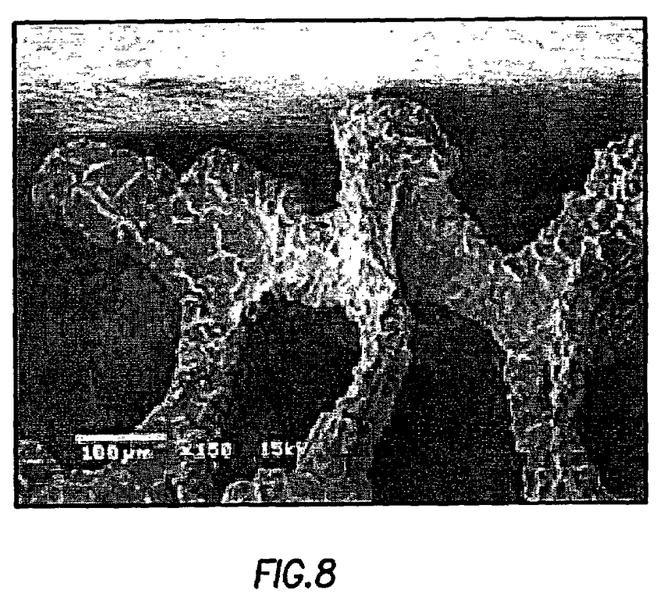
FIG. 8 is an electron micrograph of the connections between the three-dimensional open-cell foamed gas flow field magnified 150 times.

FIGS. 7 and 8 are electron micrographs of a three-dimensional open-cell foamed flow field of the present invention wherein the substantially five-sided orifices are visible and have been plated with gold. The advantage obtained from utilizing a three-dimensional open cell foamed flow field in the present invention is that it enhances mass transfer within the flow fields. This is because the mass transfer rate is supplemented by the foamed flow field itself and its wicking ability, which allows the molecules to electromosaticaly move through the flow field. Another advantage associated with the foamed flow fields of the present invention is that they also facilitate the deposit of the reactants uniformly along the surface of the catalytic active layers. A further distinct advantage of the foamed flow fields over conventional serpentine arrangements is that the foamed flow fields enhance the ternary reactions of the fuel cell. The gold plating further enhances the electromosatic movement of the molecules through the flow fields by providing microridges, evident in FIGS. 7 and 8, on the surfaces of the foamed structure's orifices. These microridges facilitate the flow of the fuel, oxidant, and water in the flow fields. The gold plating enhances mass transfer by increasing the surface area of the foam by as much as a factor of nine. Another advantage of gold plating the foamed flow field of the present invention is that the leaflet potential of the gold preserves the structure of the foamed flow fields by preventing the flow fields from undergoing electrolysis. This enhances the life of the flow fields and the fuel cell assembly itself, making the fuel cell assemblies of the present invention suitable for residential and light-commercial uses.

As shown in FIG. 5, in internal foil assembly 64, anode gas flow field 66 and cathode gas and liquid flow field 70 are attached to primary internal foil 68 through mechanical bonding, such as sintering, plating, pressing, rolling, drawing, or extruding. Another connection means would include laminating through electrochemical adhesives. This increases the electrical conductivity through the internal foil assembly by decreasing the air gap between the flow fields and the internal foil. Preferably, internal foil 68 is plated with gold as are the flow fields so as to create an undisturbed electrical connection between the flow fields and the internal foil. When a gold-plated nickel foam is used, an alloy of copper and silver should be used to sinter the gold plated, nickel foam to internal foil assembly 64.

Figure 9:
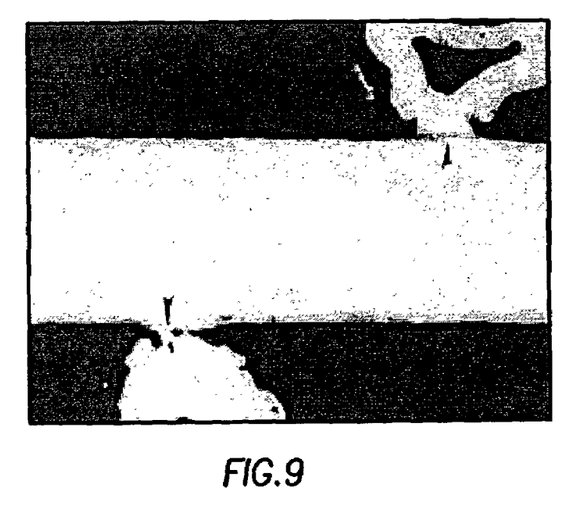
FIG. 9 is an electron micrograph of two individual connections between the three-dimensional open-cell foamed gas flow field and the internal foil of an internal foil assembly of one embodiment of the present invention.
Figure 10:
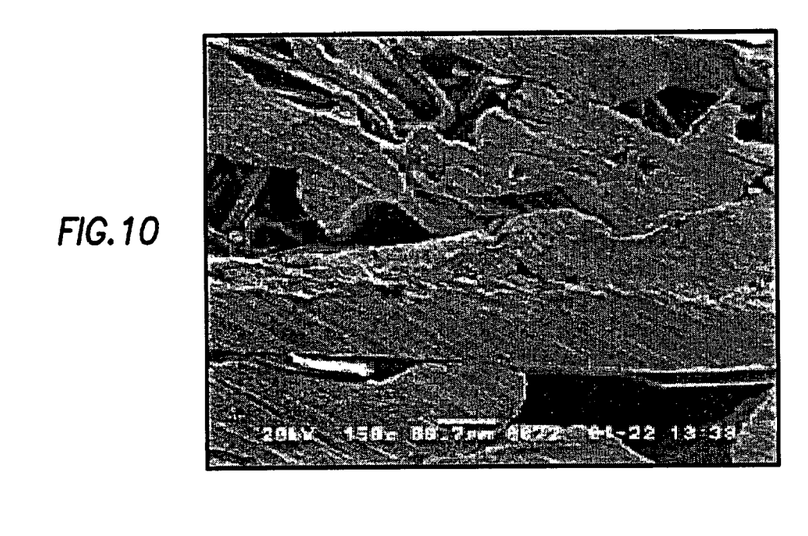
FIG. 10 is an electron micrograph of a conventional internal foil assembly formed using conventional techniques.

FIG. 9 is an electron micrograph of one embodiment of the internal foil assembly of one embodiment of the present invention illustrating the connection as shown in FIG. 5 between anode gas flow field 66, cathode gas flow field 70, and internal foil 68, wherein all three elements have been gold plated. As can be particularly seen by the arrows in FIG. 9, the substantially five-sided orifices of the open-cell foamed gas flow fields are not deformed by the bonding process of the present invention. FIG. 10 comparatively illustrates the deformation the gas flow field suffers if bonded to the internal foil using conventional techniques. The electrically consistent connection achieved in the present invention between the flow fields and the internal foil provides for more efficient mass transfer in the internal foil assembly of the present invention.

Figure 11:
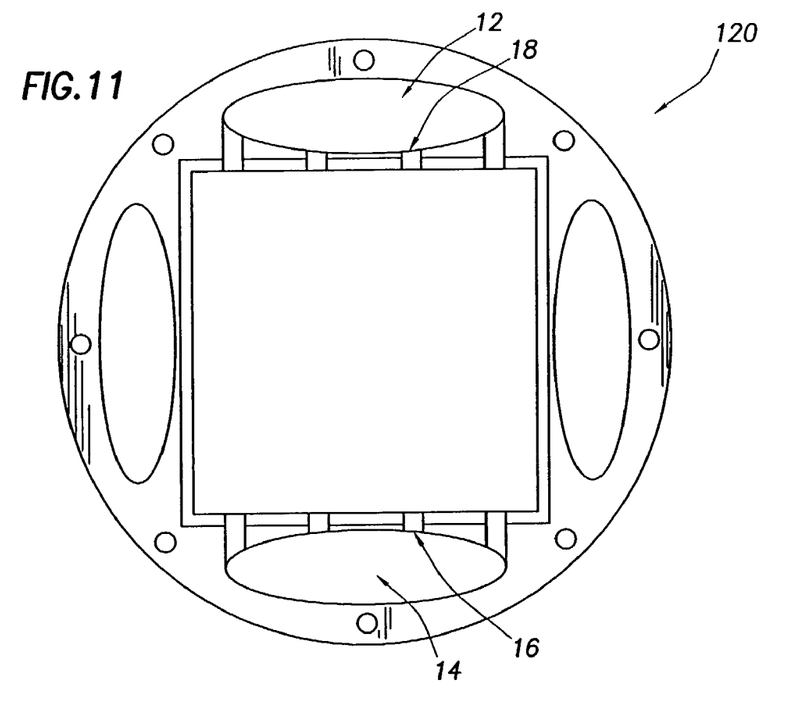
FIG. 11 is an illustration of the fuel side of a distribution frame for a fuel cell assembly of the present invention.

Shown in FIG. 11 is one embodiment of the anode side (as indicated by reference numeral 120) of distribution frame 10. Fuel inlet 12 and fuel inlet 14 provide the fuel to the fuel cell housed within the cavity of distribution frame 10 necessary for the electrochemical reaction. Specifically, the fuel is fed to the anode gas flow field through fuel supply channels 18 and 16 that stretch from the interior sides or surfaces of fuel inlet 12 and fuel inlet 14, respectively. Fuel supply channels 18 and 16 are shaped such that the supply of the fuel to the anode is preferably maintained at a constant velocity, i.e., the channels are of sufficient length, width and depth to provide fuel to the anode at a constant velocity. The velocity of the fuel entering the anode gas flow field via fuel supply channels 18 and 16 may be less than the velocity of oxidant entering the cathode gas flow field via air supply channels 25. The number of fuel supply channels in the distribution frame stoichiometrically balances the number of air supply channels so as to achieve a 2.0 to 1.0 to 2.8 to 1.0, preferably 2.0 to 1.0 to 2.4 to 1.0, air to fuel ratio. Fuel supply channels 18 and 16 also provide an edge-on connection between the fuel supply inlets and the anode gas flow field of the fuel cell housed within the cavity of the distribution frame to allow for enhanced dispersion of the fuel through the anode gas flow field. Suitable materials of construction for distribution frame 10 include nylon-6, 6, derivatives of nylon-6, 6, polyetheretherketone ("PEEK"), ABS styrene, a polyester film such as MYLAR, textar, a polyamide such as KEVLAR or any other nonconductive thermoplastic resin. Preferably, distribution frame 10 is formed from nylon-6, 6, and, if used in a stack assembly, the end plates of the fuel cell stack assembly are preferably formed from PEEK. Nylon-6, 6 is a particularly suitable material for distribution frame 10 because it dissipates electrical energy quickly so that it will not accumulate in the fuel cell assembly. It also has good compression properties. Distribution frame 10 is preferably substantially circular.

Figure 12:
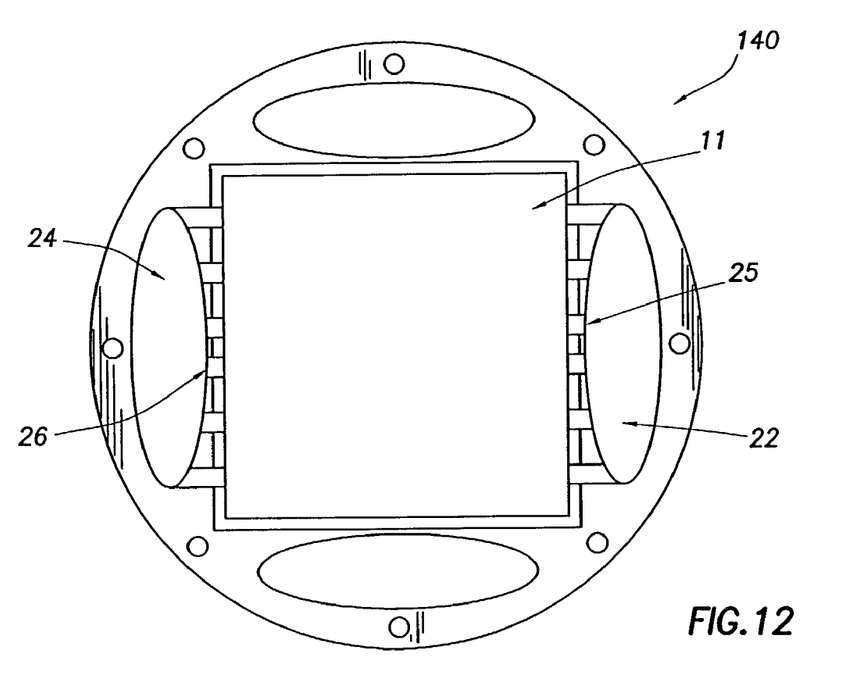
FIG. 12 is an illustration of the air side of a distribution frame for a fuel cell assembly of the present invention.

Shown in FIG. 12 is the cathode side (as indicated by reference numeral 140) of distribution frame 10. Air is a necessary reactant for the electrochemical exchange, and may be fed to fuel cell 11 via air inlet 24 in combination with air supply channels 26. Air supply channels 26 stretch from the interior surface or side of air inlet 24 to fuel cell 11, and are of such sufficient size and shape that they enable air to be fed to the cathode gas flow field at a constant velocity, i.e., they are of sufficient height, width and depth. The number of fuel supply channels 18 and 16 will most often exceed the number of air supply channels 26 to maintain a stoichiometric balance of the reactants. Free water is formed continuously in the cathode gas and liquid flow field as a by-product of the electrochemical reaction. As described, the open-cell foamed of the cathode gas and liquid flow field facilitates the removal of this free water from the cathode gas and liquid flow field efficiently. In an alternative embodiment of the present wherein the cathode gas flow field is corrugated, the microchannels in the cathode gas flow field enhance free water removal from the system. Air and water outlet 22 and air and water outlet channels 25 facilitate the flow of this free water from fuel cell 11 to allow for optimal water management in the fuel cell, and to avoid flooding and the resultant loss in power. In a stack assembly, this free water may be transported for use in other parts of the fuel cell unit, unit here meaning the balance of plant assembly. Air and water outlet 22 and air and water outlet channels 25 also facilitate dissipation of the heat generated by the electrochemical reactions.

Figure 13:
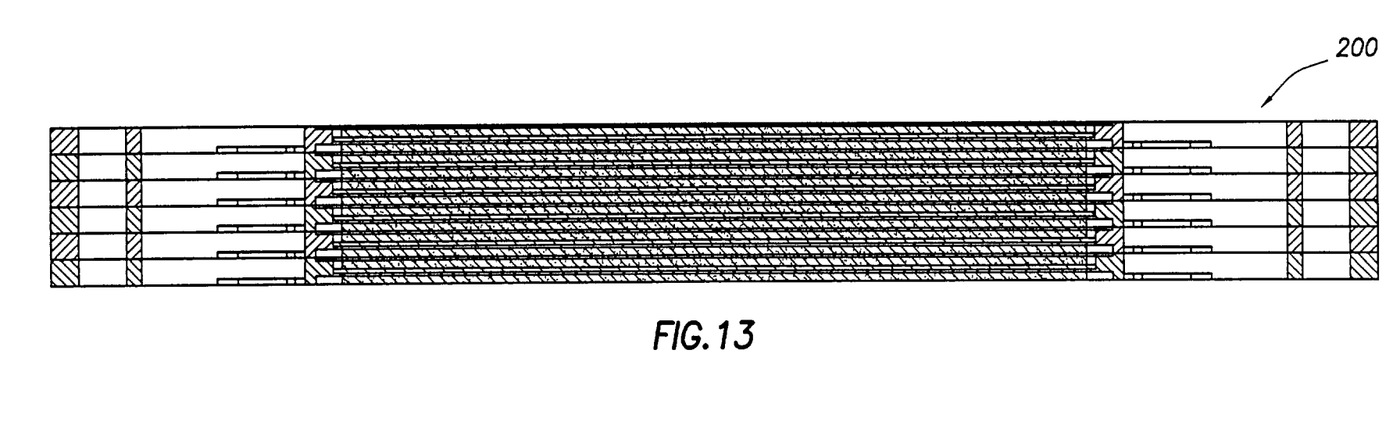
FIG. 13 is an illustration of a fuel cell stack assembly of the present invention.

FIG. 13 is a cross-section of a fuel cell stack assembly shown generally at 200 that encompasses a plurality of fuel cell assemblies. Two or more individual fuel cell assemblies can be combined to form a node. Two or more nodes can be combined to form a fuel cell stack assembly. Typically, these individual fuel cells will be interposed between end plates, which are preferably substantially circular. Stacks can be placed in series to increase voltage. Stacks can be arranged in parallel to increase amperes. In one embodiment of the present invention, 1 end plate is used for every 6 fuel cell assemblies frames to provide desirable torsional properties to the fuel cell stack assembly.

Although the present disclosure has been described in detail, it should be understood that various changes, substitutions, and alterations can be made hereto without departing from the spirit and the scope of the invention as defined by the appended claims.

What is claimed is:

1. A gas flow field for use in a fuel cell comprising a three-dimensional, open-cell, foamed structure including at least one corrugation;
   wherein the three-dimensional, open-cell, foamed structure comprises at least one material chosen from the group consisting of carbon filament, stainless steel, derivatives of stainless steel, epitaxial substrates, nickel, nickel alloys, gold, gold alloys, copper, copper alloys, thermoplastics, and iridium; and
   wherein the three-dimensional, open-cell, foamed structure is microplated with gold, iridium, copper, or silver.

2. The gas flow field of claim 1, wherein the three-dimensional, open-cell, foamed structure proximate to each of at least one of the corrugations defines a microchannel.

3. The gas flow field of claim 1, wherein the three-dimensional, open-cell, foamed structure has a plurality of corrugations.

4. The gas flow field of claim 3, wherein the corrugations each have a pitch and a run, the pitch for each corrugation being at least equal to two-thirds of the run for that corrugation.

5. The gas flow field of claim 1, wherein the open cells of the three-dimensional, open-cell, foamed structure are five-sided substantially geometrically shaped orifices.

6. A method of preparing a gas flow field comprising the steps of:
   applying metal to a particulate thermoplastic resinous material;
   adding cobalt to the metal;
   removing the particulate resinous structure to produce a three-dimensional, open-cell, foamed structure; and
   corrugating the three-dimensional, open-cell, foamed structure to define a plurality of microchannels.

7. The method of preparing a gas flow field according to claim 6 further comprising the additional step of microplating the deformed three-dimensional, open-cell, foamed structure.

8. A gas flow field made according to the method of claim 6.

9. The method of claim 6, further comprising causing the open cells of the three-dimensional, open-cell, foamed structure to have five-sided substantially geometrically shaped orifices.

* * * * *